United States Patent [19]

Bates

[11] Patent Number: 5,371,846
[45] Date of Patent: Dec. 6, 1994

[54] NON-LINEAR SCROLL BAR

[75] Inventor: Cary L. Bates, Rochester, Minn.

[73] Assignee: International Business Machines Corporation, Armonk, N.Y.

[21] Appl. No.: 777,842

[22] Filed: Oct. 16, 1991

[51] Int. Cl.$^5$ .............................................. G06F 15/62
[52] U.S. Cl. ................... 395/157; 345/123; 345/145; 395/161
[58] Field of Search ............... 395/155, 157, 161, 118; 340/721, 723, 724, 726, 706; 345/121, 123, 145, 157, 159

[56] References Cited

U.S. PATENT DOCUMENTS

| | | | |
|---|---|---|---|
| 4,586,035 | 4/1986 | Baker et al. | 340/706 X |
| 5,185,698 | 2/1993 | Hesse et al. | 364/419 |
| 5,196,838 | 3/1993 | Meier et al. | 340/724 |

FOREIGN PATENT DOCUMENTS 368997 3/1991 Japan.

OTHER PUBLICATIONS

Graphical Method of Indicating the Position of and Performing an Operation on a Plurality of Selected Objects in a Computer System, US patent application Ser. No. 07/619,628 filed Nov. 28, 1990, R. J. Torres; S. S. Fleming.

Scrollbar Having System or User Provided Information, US patent application Ser. No. 07/531,213 filed May 31, 1990, V. J. Cina Jr.; D. P. Pazel.

Primary Examiner—Heather R. Herndon
Attorney, Agent, or Firm—Curtis G. Rose; Steven W. Roth

[57] ABSTRACT

A non-linear scroll bar is associated with a window or viewport on a computer display as part of a computer system, and contains a slider to indicate relative positioning in the window of a document, such as a data file, image file, audio file, text file, or spreadsheet. The current position of a user in a document, as referenced by a cursor or other marking device, is monitored by the computer system. After a first predetermined sampling period has elapsed, a first region containing upper and lower boundaries of a portion of the document that envelop the current position in the document is created in a portion of memory called "scroll data". The initial size of the region is determined by a predetermined region growth rate. When a user moves the slider of a scroll bar, the computer system checks scroll data to see if the new current position in the document is within the first region. If so, the computer system snaps back the slider to the midpoint of the first region and displays the corresponding portion of the document. The longer the current position is in the first region, the larger the first region becomes, and the easier the midpoint of this first region is for the user to find through course positioning of the scroll bar slider.

20 Claims, 8 Drawing Sheets

| Scroll Bar Parameters | | |
|---|---|---|
| Non-Linear Scroll Bar | X ON | OFF |
| Minimum Document Size | 300 lines | |
| Sampling Rate | 20 seconds | |
| Region Growth Rate | 5 | percent of document |
| Region Reduction Rate | 2 | percent of document |
| Maximum Region Size | 25 | percent of document |
| Suspend Sampling? | YES | X NO |
| Save Regions? | X YES | NO |

FIG. 4

NON-LINEAR SCROLL BAR

FIELD OF THE INVENTION

This invention relates to the data processing field. More particularly, this invention relates to a scroll bar associated with a display window that provides a view into a presentation space.

BACKGROUND OF THE INVENTION

In the early days of the personal computer, browsing or editing a document was difficult to do. The document would often take up several screens worth of information, and it was difficult for the user to find specific sections of the document. The user would often have to scroll through an entire document screen by screen by pressing function keys assigned to a "scroll up" and "scroll down" function in an often futile attempt to find a specific section. This was slow and cumbersome, and resulted in many users printing off the entire document instead of trying to view it on the display. This was a waste of valuable natural resources, and was a giant step backwards in the often expressed goal of reaching a paperless office.

Some early editors attempted to partially solve this problem by providing a "search" or "find" function. While somewhat helpful, these functions depended on a user knowing a specific (and reasonably unique) word or string of words that is contained in the specific section he is looking for. This approach often turned into a guessing game for a user, and often resulted in the user again giving up and printing off the entire document. In addition, many users simply did not know (or couldn't remember) any specific word or string of words in the section they were looking for.

It was thought that problems like the above would be solved by a great panacea called a "graphical user interface", first introduced to the market by Apple, and later adopted by Microsoft with its "Windows" program and by IBM with OS/2 and Presentation Manager. One common feature of these graphical interface programs is a scroll bar. A scroll bar is commonly associated with a display window, and is most useful when only a small portion of a document can be displayed in a display window at any one time. The scroll bar contains what is known as a "slider". The slider's relative position in the scroll bar graphically indicates the relative position of the entire document that is currently displayed in the display window. One scroll bar is often used to indicate relative vertical position, while a second scroll bar can be used to indicate relative horizontal position.

A scroll bar is normally used in conjunction with an input device such as a mouse, track ball, or light pen. When a user wants to move to a different section of a document, he can either move the mouse cursor to a new position on the scroll bar (click operation), or can place the mouse cursor on the slider, press and hold one of the mouse buttons, and move the mouse cursor either one side or the other of the slider (drag operation). While both of these operations are helpful in rapidly moving from one section of a document to another section, they don't do much to help a user find the specific section of the document he is looking for.

Some techniques are known in the art to enhance the operation of a scroll bar to make it easier for a user to find a specific section he is looking for. One such technique is described in pending patent application Ser. No. 07/531,213, still pending, filed on May 31, 1990 by the assignee of this invention and entitled "Scrollbar Having System or User Provided Information". This application discloses displaying indicia such as alphanumeric symbols within a scroll bar to assist a user find a specific section in a document. For example, if the document contained in the window was a dictionary, the scroll bar disclosed in this application could contain some or all of the letters "A" through "Z". If the user wanted to look up a specific word that started with "P", for example, he could simply move the mouse cursor to the "P" portion of the scroll bar and click on the mouse button. While this technique is very useful in making it easier to find a specific section in a document, it is quite complex and highly dependent on the contents of the document itself, since different documents would require that different indicia be displayed in the scroll bar to be useful. In addition, documents such as image or data files are not organized in a manner that would allow this technique to be used.

Another technique for enhancing the operation of a scroll bar is described in pending patent application Ser. No. 07/619,628, filed on Nov. 28, 1990 now abandoned in favor of application Ser. No. 08/180,514, by the assignee of this invention and entitled "Graphical Method of Indicating the Position of and Performing an Operation on a Plurality of Selected Objects in a Computer System". This application discloses placing a marker icon in a scroll bar when an object in a window is selected. This technique makes it easier for a user to quickly scan previously visited areas of a document. While helpful, this technique loses much of its effectiveness if multiple areas of a document are selected, since the scroll bar quickly fills up with marker icons that have less and less meaning. In addition, this technique contains no indication as to when, how long, or how often a specific area of the document has been viewed.

SUMMARY OF THE INVENTION

It is a principal object of the invention to enhance the operation of a scroll bar.

It is another object of the invention to provide an enhanced scroll bar so that users are able to quickly locate a specific section of the document.

It is another object of the invention to provide an enhanced scroll bar that makes it easier for a user to find a specific section of the document that has been viewed frequently or for long periods of time.

These and other objects are accomplished by the non-linear scroll bar disclosed herein. The scroll bar is associated with a window or viewport on a computer display as part of a computer system, and contains a slider to indicate relative positioning in the window of a document, such as a data file, image file, audio file, text file, or spreadsheet. The current position of a user in a document, as referenced by a cursor or other marking device, is monitored by the computer system. After a first predetermined sampling period has elapsed, a first region containing upper and lower boundaries of a portion of the document that envelop the current position in the document is created in a portion of memory called "scroll data". The initial size of the region is determined by a predetermined region growth rate. For example, if the current position of a 1000 line document is line 450 and if a 5% region growth rate is specified, a region having a lower boundary of line 425 and an upper boundary of line 475 is created in scroll data.

After a second sampling period has elapsed, the computer system again checks the current position in the document. If the current position is still within the first region, the size of the first region is expanded by the amount of the predetermined region growth rate. This expansion continues incrementally for as long as the current position remains in the first region, up until a maximum region size is reached.

When a user moves the slider of a scroll bar, the computer system checks scroll data to see if the new current position in the document is within the first region. If so, the computer system snaps back the slider to the midpoint of the first region and displays the corresponding portion of the document. The longer the current position is in the first region, the larger the first region becomes, and the easier the midpoint of this first region is for the user to find through course positioning of the scroll bar slider. This technique effectively expands the target area of portions of the scroll bar without requiring the visual appearance of the scroll bar itself to change.

The midpoint of the first region can migrate based on the exact positioning within the first region as each sampling period expires. The top of the region is expanded as the current cursor position remains in the top segment of the region, and the bottom of the region is expanded as the current cursor position remains in the bottom segment of the region.

If the current position has moved outside of the first region, a second region is created containing the new current position. As long as the current position remains in the second region, the size of the first region is reduced by a predetermined region reduction rate, while the size of the second region is expanded by a predetermined region growth rate. This continues until the size of the first region is reduced to a minimum region size and disappears, and until the size of the second region reaches a maximum region size.

The computer system continues to monitor the current position in the document as long as the document is in use, or until a suspend sampling indication is received from the user. Once work on the document is completed, the computer system saves the present state of all active regions of the scroll bar in storage for the next time the document is used.

BRIEF DESCRIPTION OF THE DRAWING

FIG. 4 shows an exemplary screen used to set scroll bar parameters.

DESCRIPTION OF THE PREFERRED EMBODIMENT

Co-pending U.S. patent application Ser. No. 07/777,867, now abandoned in favor of Ser. No. 08/661,642, entitled "Visually Aging Scroll Bar", commonly assigned and filed on even date herewith, is related to this patent application and is hereby incorporated by reference.

Figure 1:
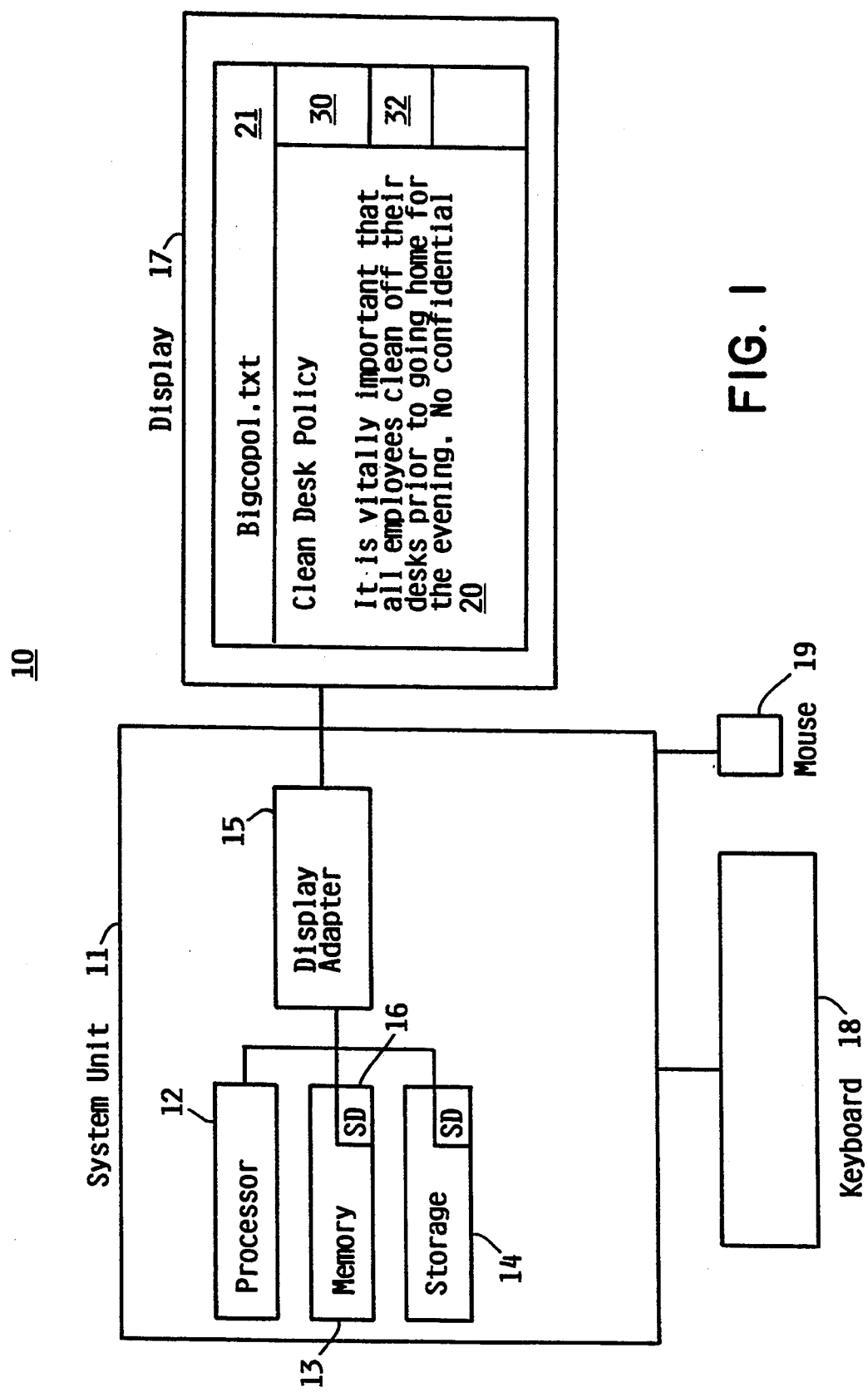
FIG. 1 shows a block diagram of the computer system of the invention.

FIG. 1 shows a block diagram of computer system 10 of the invention. Computer system has display 17, keyboard 18, and input device 19, each of which is connected to system unit 11. System unit 11 contains processor 12 connected to memory 13, storage 14, and display adapter 15. Processor 12 is suitably programmed to carry out this invention, as described in more detail in the flowcharts of FIGS. 5 and 6.

In the preferred embodiment, computer system 10 is an IBM PS/2, where processor 12 is an Intel 80386 microprocessor. Display adapter 15 is an IBM 8515 display adapter, and display 17 is an IBM 8515 display. Input device 19 is preferably an IBM mouse but may also be a track ball, light pen, or other input device. Storage 14 is a magnetic hard disk file and contains operating system software, preferably OS/2 with Presentation Manager but optionally Microsoft Windows 3.0, as well as preferably one or more OS/2 application programs such as Word Perfect or optionally DOS application programs such as Microsoft Word for Windows. When running, these programs are partially or completely installed in memory 13 and executed by processor 12.

Computer system 10 could also be another type of computer system, whether it be another microcomputer such as an Apple Macintosh, a minicomputer such as an IBM AS/400, or a mainframe computer such as an IBM System/390, and still fall within the spirit and scope of this invention. In addition, computer system 10 can be a microcomputer such as described above, connected to a larger computer system such as an IBM AS/400.

Display 17 contains window 20. For the purposes of this invention, a "window" or viewport can occupy anywhere from substantially all of the display screen to a very small portion of the display screen, and may be displayed in conjunction with (possibly overlaying portions of) other windows in a multi-tasking environment such as OS/2, or be by itself in a single-tasking environment such as DOS. A portion of document 21 is displayed in window 20. Hereinafter, the name "document" shall be used to refer to any data file, text file, image file, audio file, spreadsheet, etc, that cannot be fully displayed or otherwise represented in window 20. Window 20 also contains scroll bar 30. Scroll bar 30 has slider 32. The relative position of slider 32 in scroll bar 30 indicates the relative position of document 21 currently displayed in window 20.

For illustrative purposes, document 21, a portion of which is shown in window 20 of FIG. 1, is part of a Policy and Procedures manual for a hypothetical large corporation. Our hypothetical large corporation has deemed that this manual be reviewed on a regular basis by all employees. To save paper, employees must review the document on-line and must not even think about printing off the whole document.

Figure 2:
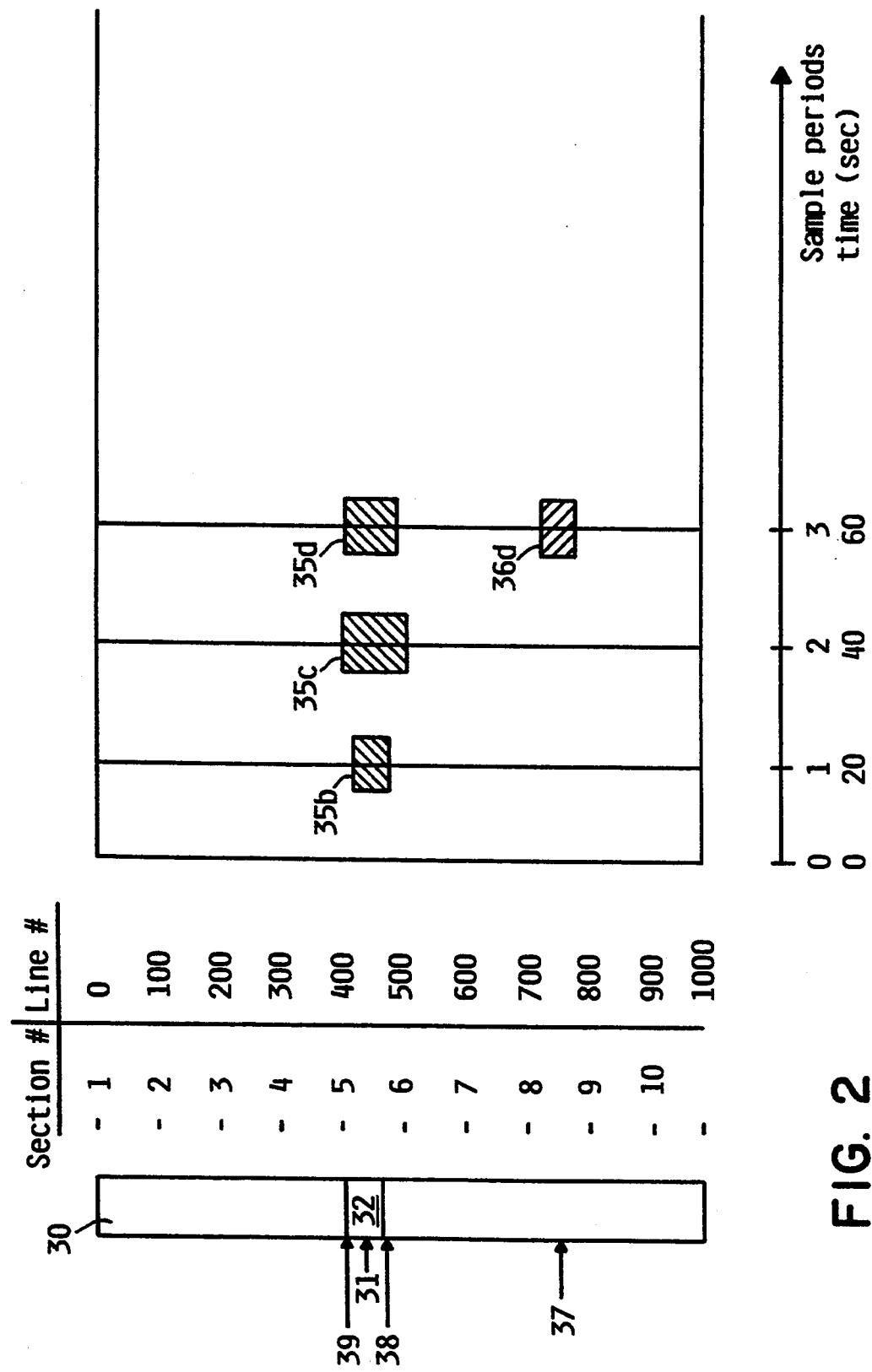
FIG. 2 shows how non-linear regions of a scroll bar are created and get larger and smaller based on the current position in a document.
Figure 3A:
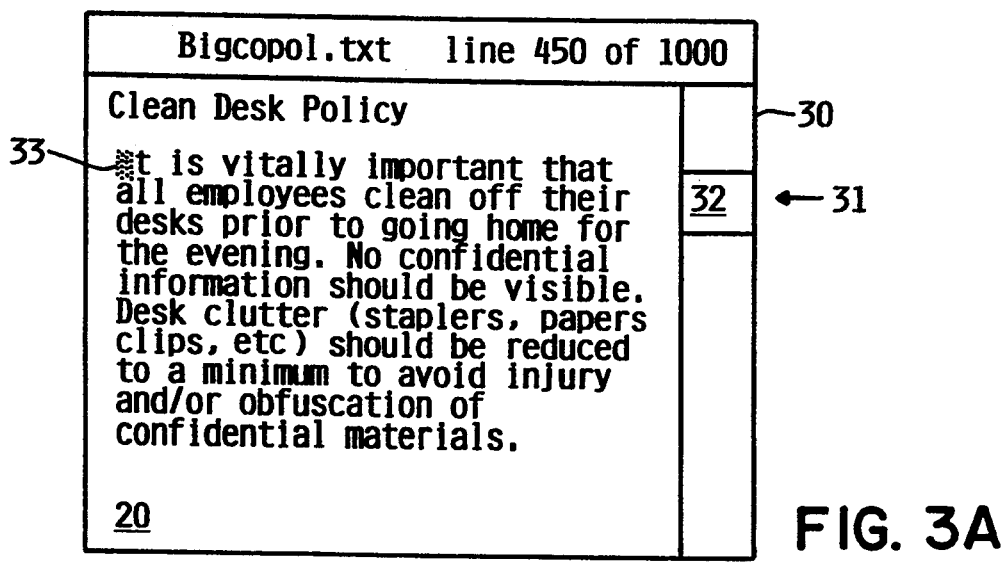
FIGS. 3(a)-3(c) shows how a specific section of a document that has been viewed for a period of time can be found again through course positioning of the scroll bar slider.

FIG. 2 shows how non-linear regions of a scroll bar are created in a portion of memory 13 called "scroll data" (shown in FIG. 1 as scroll data 16) and get larger and smaller based on the current position in a document, as a function of elapsed time. This figure will be discussed in conjunction with FIGS. 3A-3C and FIG. 4. For purposes of illustration, let's assume that our user is reviewing the Policy and Procedures manual. This manual is 1,000 lines long—100 lines per section. FIG. 2 shows how this manual is mapped to a conventional scroll bar. The document is linearally represented through the scroll bar. For example, if a user wanted to go to the middle of section 5 of the manual (line 450), he would use a drag operation to move his mouse pointer to point 31 of scroll bar 30. Slider 32 would move to point 31 on scroll bar 30. FIG. 3A shows the section of document 21 visible to our user in window 20, and shows the location of slider 32 at point 31 of scroll bar 30.

FIG. 2 shows how a first region is created and mapped to scroll bar 30 in the preferred embodiment of the invention. Since our user has his text cursor 33 (or other position marking device) on line 450 of document 21 (FIG. 3A), line 450 is considered to be our current position in document 21. After a first sampling rate has elapsed (set to be 20 seconds, as shown in FIG. 4), the first region for this document is created in scroll data 16, as shown by the reference numeral 35b. The initial size of region 35b is determined by a specified region growth rate. In our example, the current position of a 1000 line document is line 450, and a 5% region growth rate has been specified, as shown in FIG. 4. Therefore, region 35b is initially a 50 line region from line 425 to line 475. Therefore the lower boundary of region 35b (line 425) and the upper boundary of region 35b (line 475) is stored in scroll data 16. Note that the midpoint of region 35b is our current position in document 21 of line 450.

Another 20 seconds goes by. Since our user is reading this section of the document carefully, he has not moved from line 450 of the document. Since the current position of the document is still within the first region, the size of the first region is expanded by the amount of the predetermined region growth rate. Since a 5% region growth rate was specified (FIG. 4), the first region is expanded from its size of 50 lines shown by region 35b to a size of 100 lines (lines 400 to 500) shown by region 35c of FIG. 2.

Figure 3B:
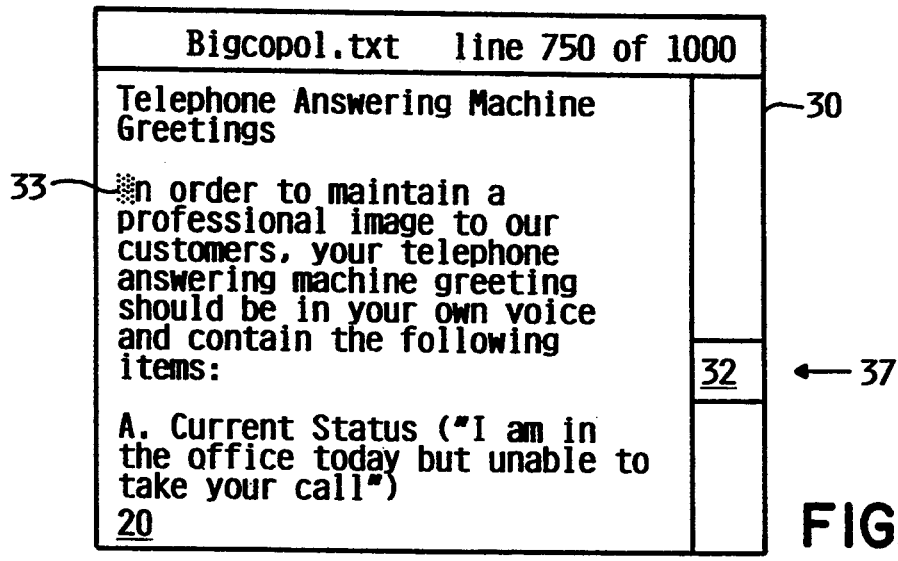

Our user now wants to take a quick look at another section of the manual. He moves his mouse pointer (via a drag operation in the preferred embodiment) down to point 37 of scroll bar 30. The slider moves to this point and the portion of the document now displayed to our user is shown in FIG. 3B. Another 20 seconds goes by. The current position is now at line 750. A second region for this document is created in scroll data 16, as shown by the reference numeral 36d. The initial size of region 36d is again determined by the specified region growth rate. In our example, the current position of our 1000 line document is line 750, and a 5% region growth rate has been specified, as shown in FIG. 4. Therefore, region 36d is initially a 50 line region from line 725 to line 775. Since the current position of our document is no longer in the first region, the size of the first region is reduced by the region reduction rate of 2% specified in FIG. 4. Therefore, the size of our first region is reduced by 20 lines from 100 lines to 80 lines, as shown by region 35d. Region 35d now has lower and upper boundaries of line 410 and line 490, respectively.

Figure 3C:
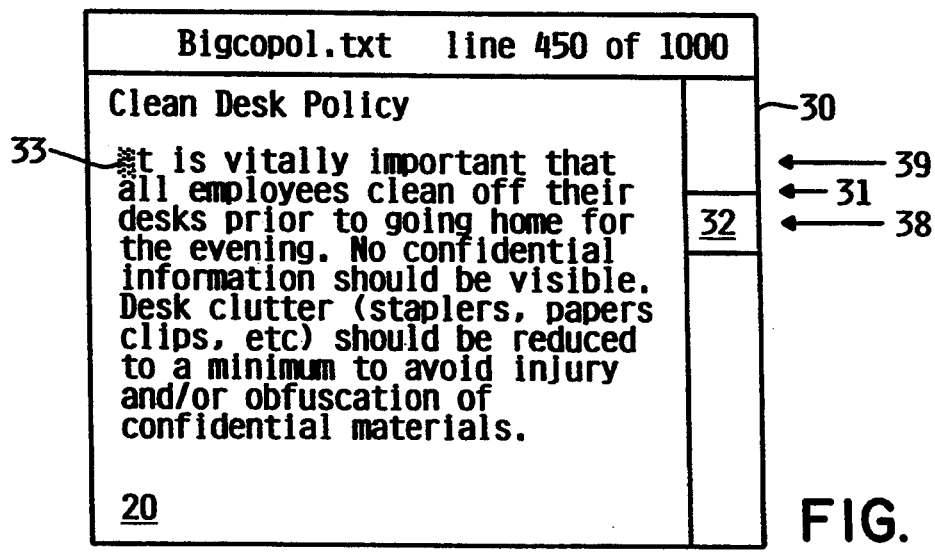

Our user now wants to go back to where he was— line 450 of the manual. Since the user was at line 450 before, and since he spent a fair amount of time there, this invention makes it much easier for our user to find his way back. All he has to do is to move the mouse pointer to a target area on scroll bar 32 that corresponds to a document location somewhere within the first region—lines 410 to 490. Moving the mouse pointer to point 31 of scroll bar 30 will return the user to line 450, as was done before. But moving the mouse pointer to point 38 of scroll bar 30 will also return the user to line 450 and, in the preferred embodiment, "snap back" slider 32 to point 31. In addition, moving the mouse pointer to point 39 will also return the user to line 450 and snap back the slider. In fact, moving the mouse pointer to any point in a target area on scroll bar 32 that corresponds to a document location within region 35d (hereinafter alternatively referred to as "selecting a point in the region") will return the user to line 450. The existence of the first region in scroll data 16 makes scroll bar 30 non-linear—selecting any point in region 35d will return the user to the midpoint of the region—line 450 in our example. The bigger the region, the easier it is for our user to find line 450 of the document, and the positioning of the slider on the scroll bar can become increasingly more course (with or without a "snap back" operation), as is shown in FIG. 3C.

FIG. 4 shows the scroll bar parameters, most of which have been previously discussed. These parameters are normally assigned default values, but can be presented to the user upon demand for possible modifications. The first parameter asks whether the non-linear scroll bar should be on or off. There may be instances where the user would prefer that the scroll bar operate in a conventional (linear) fashion. The next parameter specifies a minimum document size. Since many of the advantages of a non-linear scroll bar are lost with small documents, this function is disabled for documents smaller than the specified minimum size. The next three parameters—sampling rate, region growth rate, and region reduction rate, have already been discussed. Completely different results can be obtained based on how these parameters are selected. This flexibility can be used to closely fit a user's specific situation. For example, if it is desirable to have regions grow very slowly over time, a user might want to set a sample rate of 5 minutes and a region growth rate of 1%.

The next parameter is a maximum region size. This parameter specifies how large a region will be allowed to grow. The next parameter asks if a user wants to suspend sampling. This parameter can be selected via the screen shown in FIG. 4, or a special key sequence can be set up to toggle this parameter on or off. This parameter could be quite useful to minimize the effects of bathroom breaks or other interruptions on the non-linear nature of the scroll bar. The next parameter asks if the regions created during the viewing of this document should be saved when the document is no longer in use. If so, historical information about how the document has been used is maintained from session to session, and the boundaries of the regions are stored on storage 14 of FIG. 1. If not, all regions are erased when the document is exited, and the scroll bar is initialized to its conventional, linear settings the next time this document is accessed.

Figure 5A:
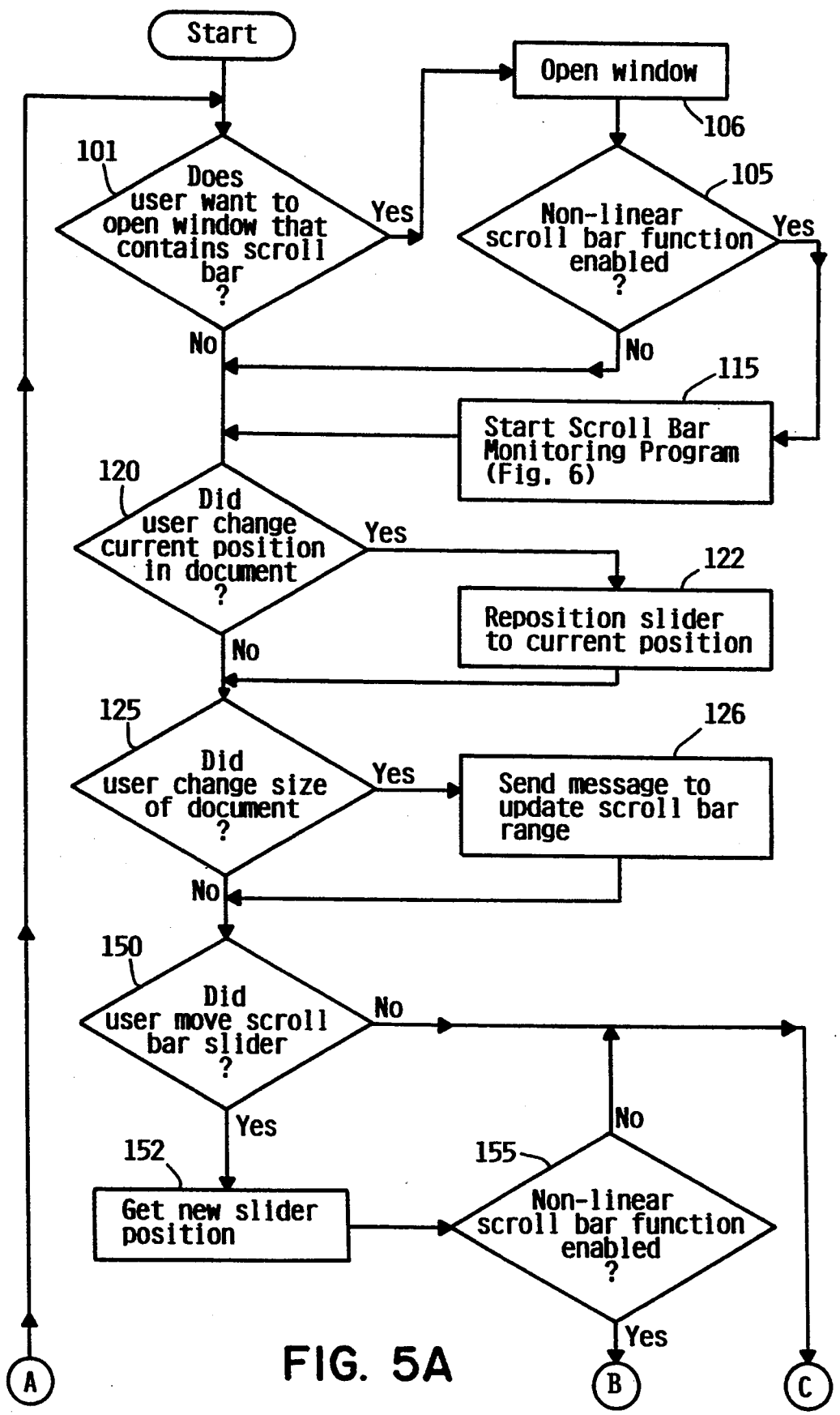
FIGS. 5(a)-5(B)-6(a)-6(b) show the flowcharts of the operation of the scroll bar of the invention.
Figure 5B:
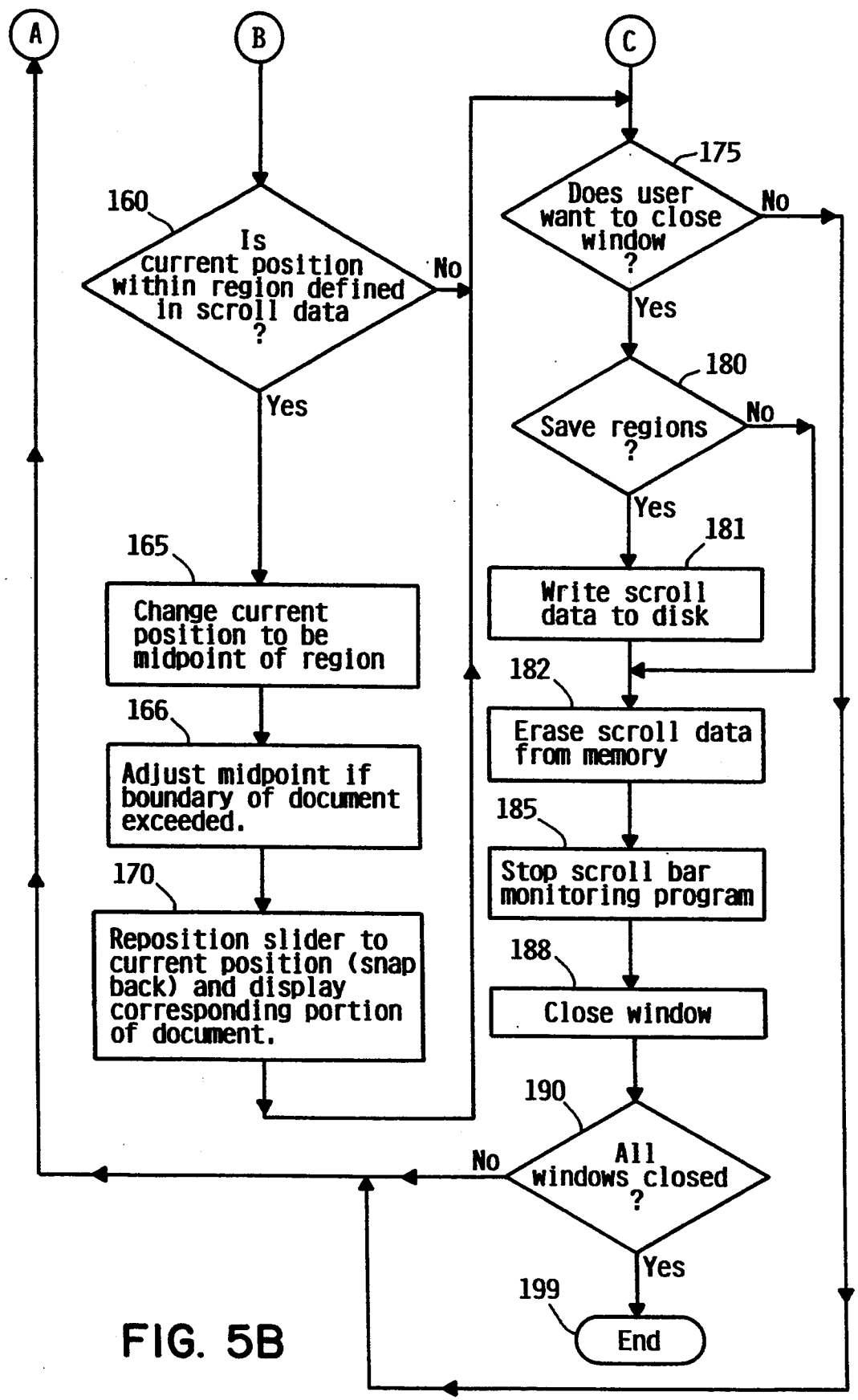

The operation of this invention, as shown in the flow-charts of FIGS. 5-6, will now be described in more detail. Referring now to FIG. 5, block 101 asks if the user has requested that a window be opened that contains a scroll bar. If so, block 106 opens the window in a conventional manner. In the preferred embodiment, Presentation Manager performs this step. Block 105 checks to see if the non-linear scroll bar parameter (FIG. 4) is enabled. If so, block 115 starts the scroll bar monitoring program, shown in FIG. 6. Note that the program shown in FIG. 5 executes concurrently with the program shown in FIG. 6.

Figure 6A:
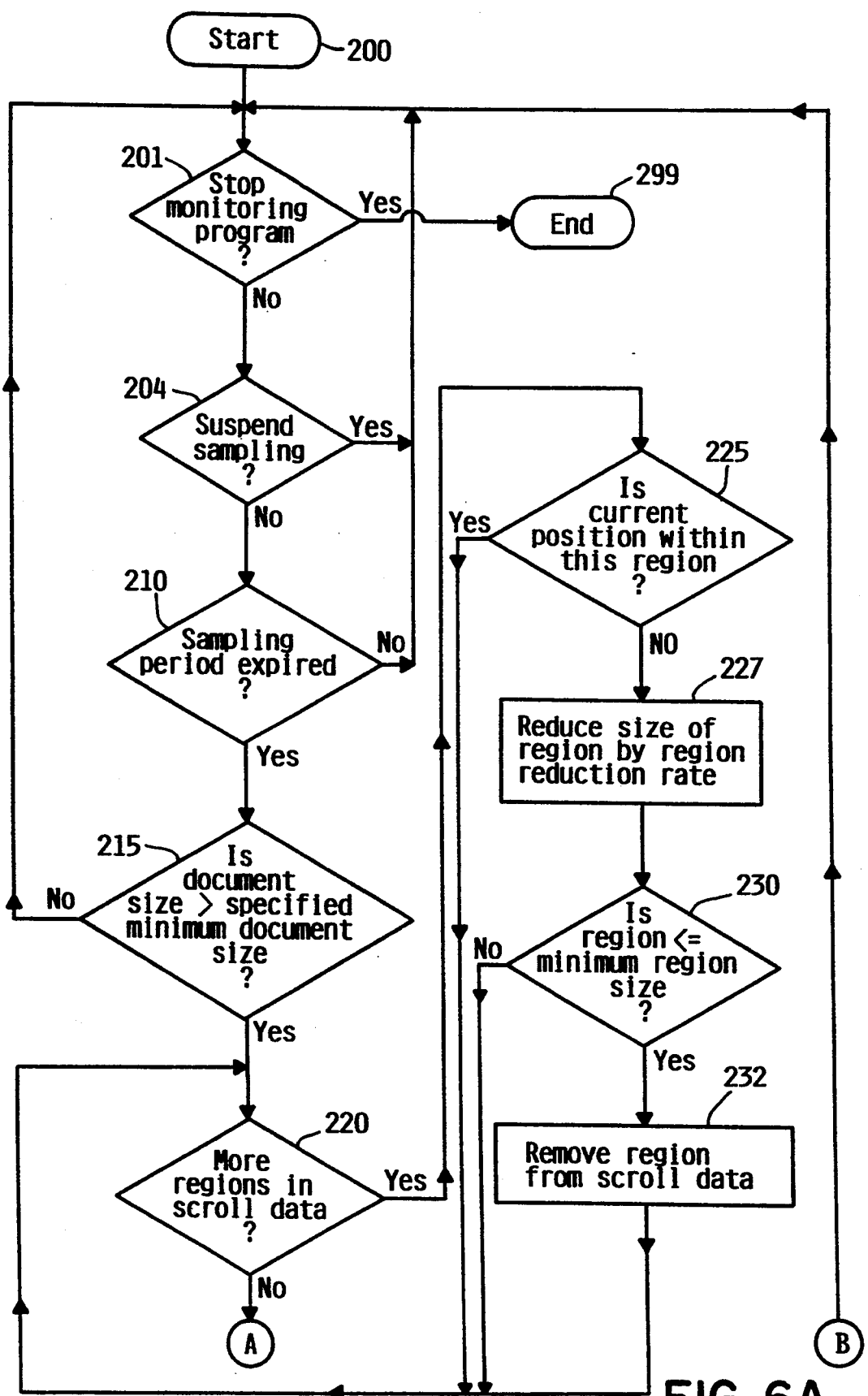
Figure 6B:
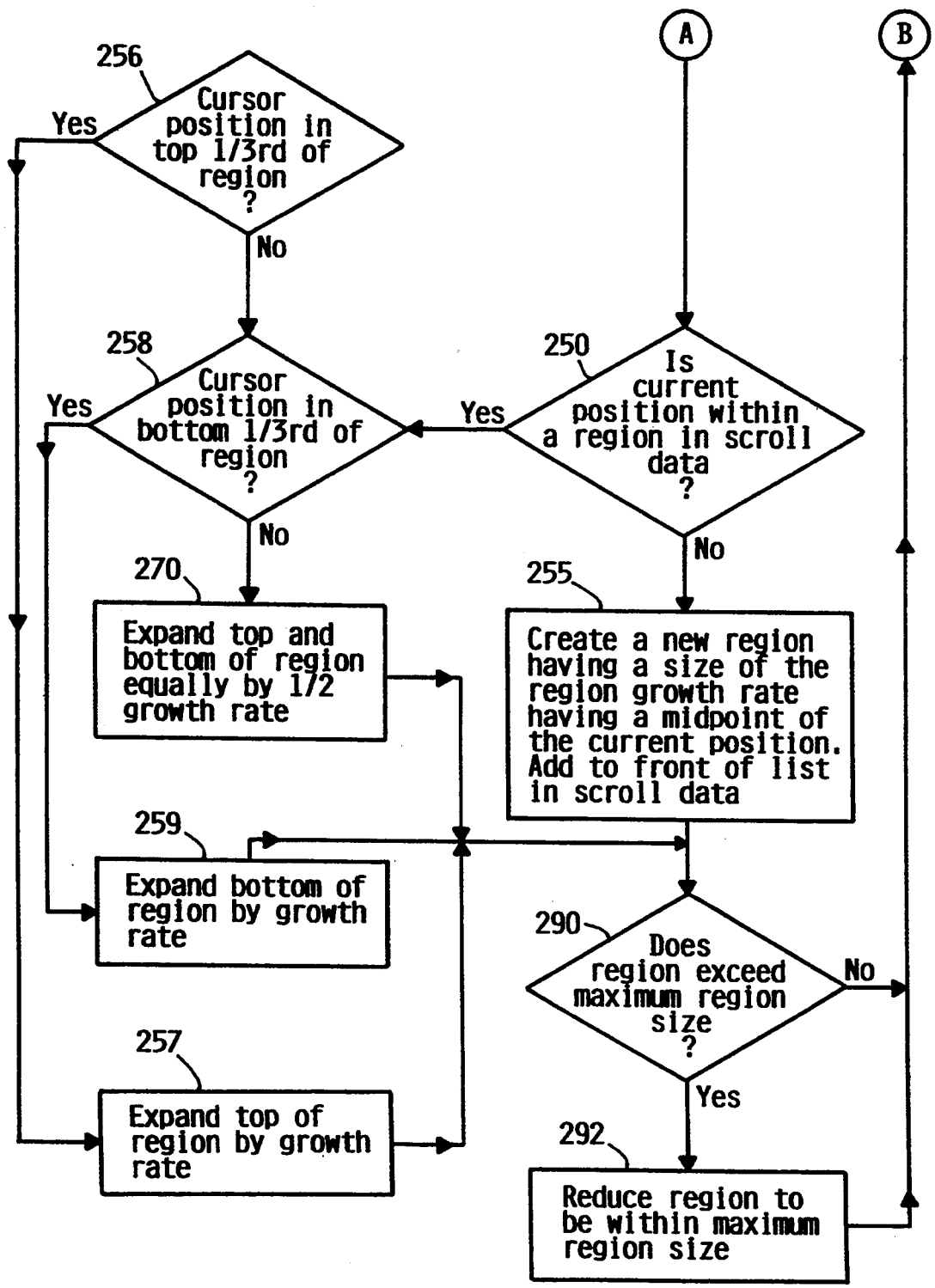

Referring now to FIG. 6, block 201 checks to see if block 185 of FIG. 5 has indicated that the monitoring program should be stopped. If so, the program ends in block 299. If not, block 204 checks to see if it has received an indication from the user (FIG. 4) that the sampling should be suspended. If such an indication has been received, the program loops back to block 201. If no such indication has been received, flow of control moves to block 210. Block 210 checks to see if the sample period specified in FIG. 4 has elapsed. If not, flow of control goes back to block 201. If a sample period has elapsed, block 215 checks to see if the document size (determined by Presentation Manager) is greater than the minimum document size specified in FIG. 4. If not, flow of control goes back to block 201. The program could optionally end if block 215 is answered negatively, but since a document could start off smaller than the minimum document size but grow bigger than the minimum document size as it is edited, it is more appropriate to loop through blocks 201, 204, 210, and 215 checking for this condition.

If block 215 is answered positively, block 220 checks a portion of memory 13 referred to as scroll data 16 to see if one or more regions are specified for this document. If there is no "scroll data" in memory 13, block 220 checks to see if there is any "scroll data" in storage 14 saved from a previous session with this document (block 181 of FIG. 5B). If there is "scroll data" in storage 14, this "scroll data" is copied into memory 13. Scroll data 16 contains the upper and lower boundaries of each region. If a region is specified in scroll data 16, this region is passed on to block 225. Block 225 checks to see if the current position for this document is contained in this region. If so, flow of control goes back to block 220 to look for more regions, effectively skipping this region. If not, it is appropriate to reduce the size of this region, since the current position for this document is not in this region. Block 227 reduces the size of this region by the reduction rate. For example, if our region is between lines 400 and 500, and if the document is 1000 lines long and the reduction rate is 2%, block 227 reduces the size of this region to have a lower and upper boundary of lines 410 and 490, respectively.

Block 230 checks to see if this region is now less than or equal to a predetermined minimum region size. In the preferred embodiment, the minimum region size is "hard coded" to be zero, although this could be another user-defined scroll bar parameter such as those shown in FIG. 4. If block 230 is answered affirmatively, block 232 removes the region from scroll data. In either event, flow of control returns back to block 220, where the next region is passed to block 225. When block 220 determines that all the regions contained in scroll data have been processed, flow of control moves to block 250.

Block 250 asks if the current position for this document is within any of the regions designated in scroll data. For example, if the current position is line 450, block 250 would check the regions specified in scroll data to see if line 450 falls within any of their specified boundaries. If not, a new region needs to be created. Block 255 creates a new region the size of the region growth rate specified in FIG. 4, with the midpoint of the region being the current position for this document. For example, if the current position of a 1000 line document is line 450, and a 5% growth rate was specified, a 50 line region from line 425 to 475 is created in block 255. This newly created region is added to the front of the list of regions contained in scroll data. This is done to assure the most newly created region is selected (by block 60) in the event the current cursor position is contained in more than one region (i.e., there are overlapping regions).

If block 250 indicates that the current position for this document is within a region designated in scroll data, this means that a region has already been created and it needs to be expanded.

Block 256 checks to see if the current cursor position is in the top segment of the region. In the preferred embodiment, this is the top one-third of the region. If so, only the top of the region is expanded by the region growth rate in block 257. This allows a region to migrate to reflect current positioning within the region. If block 256 is answered negatively, block 258 checks to see if the current cursor position is in the bottom segment of the region. In the preferred embodiment, this is the bottom one-third of the region. If so, the bottom of the region is expanded by the region growth rate in block 259, thereby allowing the region to migrate downwardly to reflect the current positioning. If block 258 is answered negatively, the current cursor position is in the middle segment of the region.

Block 270 expands the region equally on both ends by one-half of tile region growth rate specified in FIG. 4. For example, if the current position of a 1000 line document is in a 50 line region from line 425 to 475, and a 5% region growth rate was specified, the region is expanded to 100 lines, from line 400 to line 500. In this case the midpoint of the region remains the original midpoint of line 450, and the region does not migrate.

Regardless of how block 250 is answered, block 290 ultimately checks to see if the region created exceeds the maximum region size specified in FIG. 4. If so, block 292 reduces the region size equally on both ends to be within the maximum region size specified in block 292. Flow of control returns to block 201.

While the monitoring program of FIG. 6 is executing, the program of FIG. 5 continues to execute as well. As previously stated, block 115 starts the scroll bar monitoring program of FIG. 6. After block 115 is executed, block 120 asks if the user changed the current position in the document. This would normally be done by moving the cursor that marks the position where text or other information can be inserted into the document. If block 120 is answered affirmatively, block 122 repositions the slider in the scroll bar to reflect the new current position. A scroll bar paint event is generated by Presentation Manager to update the visual appearance of the scroll bar.

Regardless of how block 120 is answered, flow of control eventually goes to block 125, which asks if the size of the document has changed. The document size can change either from the addition or deletion of information, such as text. If block 125 is answered affirmatively, block 126 sends a message to update the scroll bar range. This step is conventionally performed by Presentation Manager in the preferred embodiment. A scroll bar paint event may be generated by Presentation Manager to update the visual appearance of the scroll bar.

Block 126 also shifts or otherwise adjusts the upper and/or lower boundaries of the regions in scroll data 16 to correspond to the change in document size, if necessary.

Block 150 then asks if the user moved the scroll bar slider. In the preferred embodiment, the user moves the mouse cursor to a new position on the scroll bar by placing the mouse cursor on the slider, pressing and holding one of the mouse buttons, and moving the mouse cursor either one side or the other of the slider (drag operation). Block 152 gets the new current position in the document that corresponds to the new slider position. In the preferred embodiment, this information is obtained by querying Presentation Manager in a conventional manner well known to those skilled in the art. Block 155 then checks to see if the non-linear scroll bar feature has been enabled (FIG. 4). If not, flow of control skips to block 175. If so, block 160 asks if the current position falls within the boundaries of a region specified in the scroll data stored in memory 13. As previously discussed, block 160 starts at the beginning of the scroll data list of regions and stores when it finds a region having this position. Since newly created regions are placed at the top of the list, the newest created region is selected by block 160 in the event of overlapping regions. If so, block 165 changes the current position to be the midpoint of the specified region. For example, if the user moved the scroll bar slider, and Presentation Manager indicated a corresponding current position in the document of line 485, and block 160 indicated that line 485 fell within a region in scroll data having boundaries of line 400 and line 500, block 165 will change the current position (line 485) to the midpoint of the region (line 450).

Block 166 check to see that the midpoint of the region falls within the boundaries of the document. If not, this point is adjusted to be either the beginning or end of the document, whichever is appropriate.

Block 170 updates the global variable in memory 13 that keeps track of the current position within the document, and repositions the slider to the new current position and displays the corresponding portion of the document. The operation performed by block 170 is referred to as a "snap back" operation, since a user will generally be able to perceive that the slider has moved slightly (but quickly) from where he had positioned it. Alternatively, block 170 could display the portion of the document at the new current position but not move the slider. Flow of control moves on to block 175.

Block 175 asks if the user wants to exit the window. A user normally exits a window by moving the mouse cursor to a special "exit" icon in the window and double clicking the mouse. If block 175 is answered affirmatively, block 180 asks if the user has indicated that any regions created should be saved (FIG. 4). If not, the scroll data in memory 13 is erased in block 182, and will not be available to the user the next time he accesses this document. If block 180 is answered affirmatively, block 181 writes the scroll data associated with this document to storage 14, so it can be reloaded back into memory 13 the next time this document is accessed. Block 185 stops the scroll bar monitoring program of FIG. 6. Block 188 then exits the window in a conventional manner. Block 190 then asks if all windows have been closed. If so, the program ends in block 199. If not, flow of control returns to block 101. For purposes of this patent application, changing documents within a window will be considered to be the same as closing the window and opening a new window.

The discussion thus far has primarily concentrated on a window containing a single vertical scroll bar associated with a document. The same discussion is equally applicable for a window that contains two or more scroll bars. For example, if the document in the window contains image data (i.e. a map of a city), the window would contain a horizontal as well as a vertical scroll bar. Both scroll bars would be independently executing the flowcharts of the programs shown in FIG. 5 and FIG. 6.

While this invention has been described with respect to the preferred embodiment, it will be understood by those skilled in the art that various changes in detail may be made therein without departing from the spirit, scope and teaching of the invention. For example, the actual appearance of the scroll bar may change from what is known today, and it may even be called something completely different, even though it has an equivalent function to the scroll bars known today. Accordingly, the herein disclosed is to be limited only as specified in the following claims.

What is claimed is:

1. A computer system having a display and a scroll bar, comprising:
    means for detecting a first position in a document, wherein said first position is a current position;
    means for creating a first region for said scroll bar, said first region having an upper boundary, a lower boundary, and a first size and including said first position in said document; and
    means for incrementally expanding said first size of said first region as long as said current position remains in said first region.

2. The computer system of claim 1, further comprising:
    means for incrementally decreasing said first size of said first region when said current position is no longer in said first region, 3. The computer system of claim 2, further comprising:
    means for removing said first region when said first region reaches a predetermined minimum size.

4. The computer system of claim 2, wherein said first size of said first region is incrementally decreased at a predetermined region reduction rate at a predetermined sampling rate.

5. The computer system of claim 2, further comprising:
    means for temporarily suspending said means for incrementally decreasing said first size of said first region in response to a suspend sampling request; and
    means for resuming said means for incrementally decreasing said first size of said first region in response to a resume sampling request.

6. The computer system of claim 2, further comprising:
    means for executing said means for incrementally decreasing said first size of said first region only if said document exceeds a predetermined minimum size.

7. The computer system of claim 1, further comprising:
    means for determining that said first region has reached a predetermined maximum region size; and
    means for maintaining said first size of said first region as long as said current position remains in said first region.

8. The computer system of claim 1, wherein said first size of said first region is incrementally expanded at a predetermined region growth rate at a predetermined sampling rate.

9. The computer system of claim 1, further comprising:
   means for temporarily suspending said means for incrementally expanding said first size of said first region in response to a suspend sampling request; and
   means for resuming said means for incrementally expanding said first size of said first region in response to a resume sampling request.

10. The computer system of claim 1, further comprising:
    means for detecting that said current position has moved to a second position in said document;
    means for concluding that said second position is in said first region; and
    means for displaying the portion of said document corresponding to said midpoint of said first region.

11. The computer system of claim 10, further comprising:
    means for automatically snapping back said slider to the midpoint of said first region, responsive to said concluding means.

12. The computer system of claim 1, further comprising:
    means for detecting that a slider associated with said computer system has moved to a second position in said document;
    means for concluding that said second position is not in said first region;
    means for creating a second region for said scroll bar, said second region having a second size and including said second position in said document;
    means for incrementally expanding said second size of said second region as long as said second position remains the current position;
    means for incrementally decreasing said second size of said first region when said first position is no longer the current position.

13. The computer system of claim 12, further comprising:
    means for detecting that said slider associated with said computer system has moved to a third position in said document;
    means for concluding that said third position is in said first region;
    means for automatically snapping back said slider to the midpoint in said first region, responsive to said concluding means.

14. The computer system of claim 1, further comprising:
    means for executing said means for incrementally expanding said first size of said first region only if said document exceeds a predetermined minimum size.

15. The computer system of claim 1, further comprising:
    means for saving said first region upon receipt of an indication that work on said document is completed;
    means for restoring said first region upon receipt of an indication that work on said document is to resume.

16. The computer system of claim 1, wherein said means for incrementally expanding said first size of said first region expands both the upper and lower boundaries of said first region.

17. The computer system of claim 1 further comprising:
    means for detecting that the current position has moved to a second position of said document;
    means for determining that said second position is in a top segment of said first region;
    said means for incrementally expanding said first size of said first region expands only the upper boundary of said first region, thereby moving the midpoint of said first region.

18. The computer system of claim 1 further comprising:
    means for detecting that the current position has moved to a second position of said document;
    means for determining that said second position is in a bottom segment of said first region;
    said means for incrementally expanding said first size of said first region expands only the lower boundary of said first region, thereby moving the midpoint of said first region.

19. A method of creating a scroll bar having a slider, said method comprising the steps of:
    waiting for a first sampling period to expire;
    upon expiration of said first sampling period, determining a first position in a document, wherein said first position is a current position;
    creating a first region for said scroll bar, said first region having an upper boundary and a lower boundary and including said first position in said document;
    determining that said slider has moved to correspond to a second position in said document;
    concluding that said second position is in said first region; and
    displaying a portion of said document which corresponds to said first position.

20. The method of claim 19, further comprising the step of:
    automatically snapping back said slider to the midpoint in said first region, responsive to said concluding step.

* * * * *